United States Patent

Moberg

[11] Patent Number: 5,562,325
[45] Date of Patent: Oct. 8, 1996

[54] VEHICLE SEAT LOCK ARRANGEMENT

[76] Inventor: Knut Moberg, Beddingen 26, N-0250 Oslo, Norway

[21] Appl. No.: 433,526

[22] Filed: May 2, 1995

[51] Int. Cl.$^6$ ........................................... B60N 2/02
[52] U.S. Cl. ................... 297/378.13; 297/217.3; 297/217.4; 297/217.6
[58] Field of Search ............ 297/463.1, 378.1, 297/378.11, 378.12, 378.13, 216.1, 216.13, 216.14, 217.3, 217.4, 463.2; 296/63, 64, 65.1, 68.1; 70/261; 40/320

[56] References Cited

U.S. PATENT DOCUMENTS

| | | | |
|---|---|---|---|
| 1,429,057 | 9/1922 | Allen et al. | 297/463.2 X |
| 2,257,496 | 4/1939 | Gaugler et al. | 297/463.2 X |
| 2,624,613 | 1/1953 | Parmely | 296/68.1 |
| 2,815,796 | 12/1957 | Lobanoff | 296/68.1 X |
| 3,170,725 | 2/1965 | Komorowski | 296/63 |
| 3,650,347 | 3/1972 | Campos | 70/261 X |
| 4,475,763 | 10/1984 | Hamatani et al. | 297/378.13 X |
| 4,538,142 | 8/1985 | Hamilton et al. | 297/217.4 X |
| 4,779,927 | 10/1988 | Trutter et al. | 297/378.13 |
| 5,181,758 | 1/1993 | Sandvik | 297/378.13 X |
| 5,273,336 | 12/1993 | Schubring et al. | 296/63 X |
| 5,415,458 | 5/1995 | Kim | 297/378.1 X |
| 5,431,440 | 7/1995 | Spies et al. | 280/735 |

FOREIGN PATENT DOCUMENTS

| | | | |
|---|---|---|---|
| 3125068 | 1/1983 | Germany | 297/378.13 |
| 3425669 | 1/1986 | Germany | 70/261 |
| 144484 | 6/1990 | Japan | 70/261 |
| 704566 | 2/1954 | United Kingdom | 296/65.1 |

Primary Examiner—Milton Nelson, Jr.
Attorney, Agent, or Firm—Young & Thompson

[57] ABSTRACT

A vehicle seat lock arrangement comprises a seat with a sitting portion and a back supporting portion, elements for changing the position of at least a portion of the seat relative to a body part of the vehicle, and first and second interengageable lock elements releasably interconnecting the seat with the body part of the vehicle. A switch which is operatively connected with at least one of the lock elements, has a first switch state in which the first and second lock elements securely and mutually interconnect, and a second switch state in which the first and second lock elements are at least not securely interconnected. The switch forms part of an electric circuit having elements for signalling at least the second switch state.

12 Claims, 2 Drawing Sheets

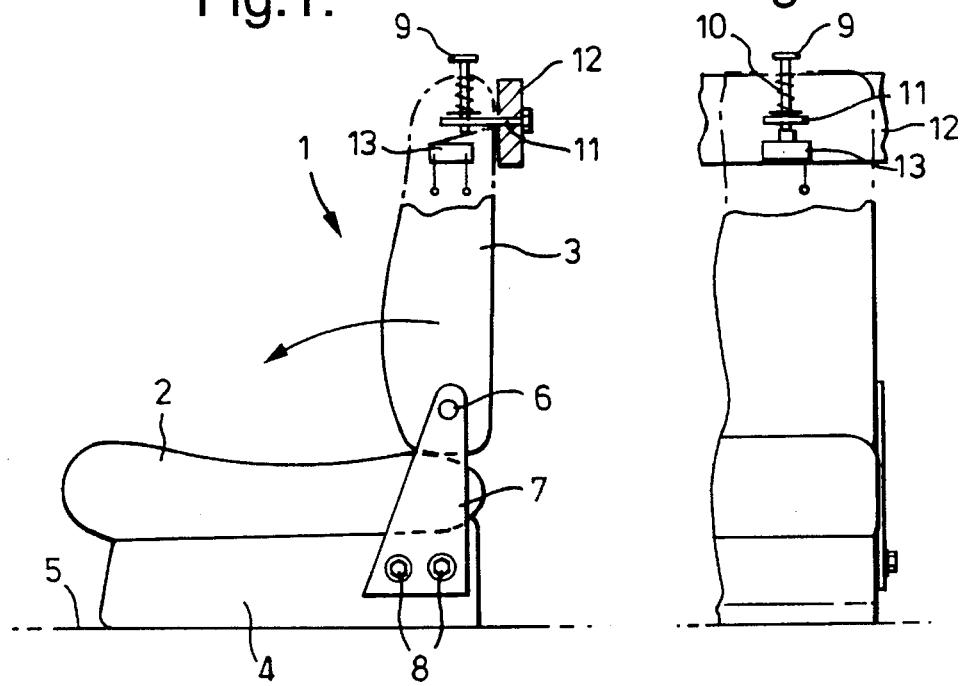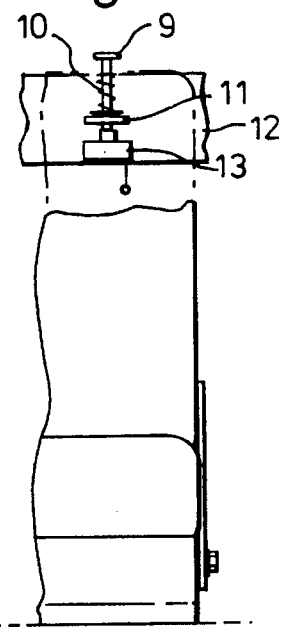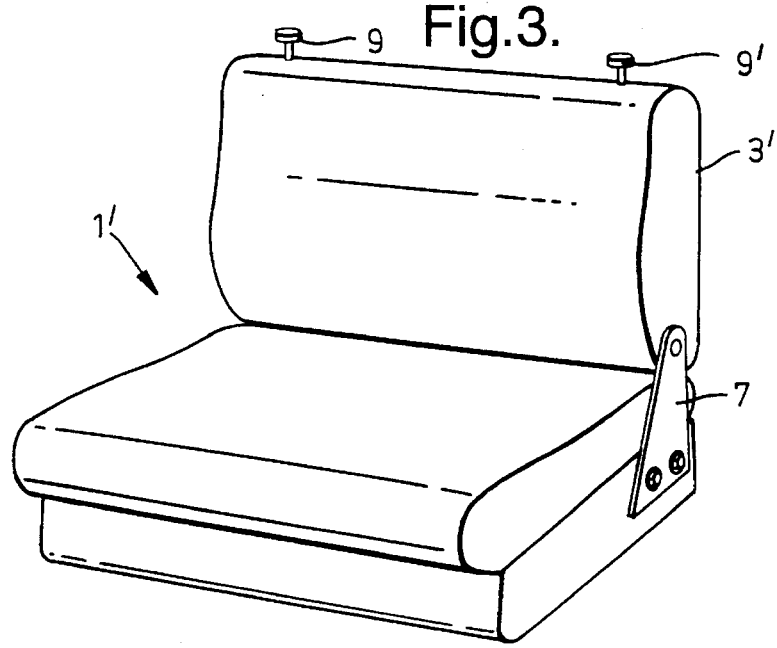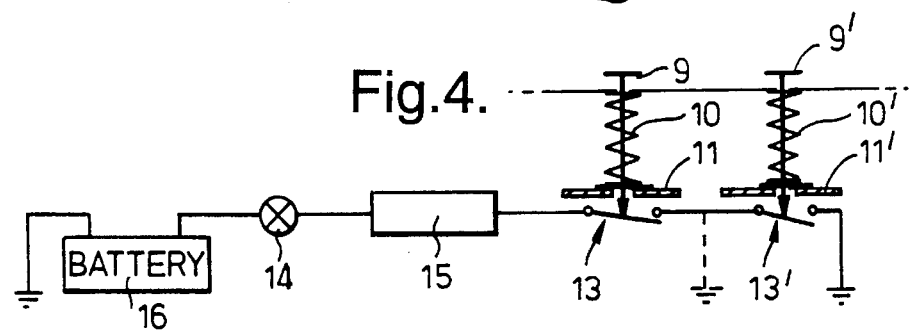

VEHICLE SEAT LOCK ARRANGEMENT

FIELD OF THE INVENTION

The present invention relates to a seat lock arrangement for a vehicle, comprising a seat means with a sitting portion and a back supporting portion, means for enabling a change of position of at least a portion of the seat means relative to a body part of the vehicle, and first and second interengageable lock means releasably interconnecting the seat means with the body part of the vehicle. The first lock means is typically located on the seat means, and the second lock means is typically located on the body part of the vehicle.

BACKGROUND OF THE INVENTION

In vehicles with a seat means of the above type, it is common to in particular the rear seat of the vehicle or car have the back supporting portion thereof releasably lockable to a body part of of the vehicle or car. Such car may be of the saloon, hatchback or estate type.

If the back supporting portion is not properly locked to the body part, there will be no indication of insufficient interengagement between the first and second lock means. In a situation of in particular a head-on car collision, this may be fatal to the health of rear seat passengers and might also involve a risk to the health of the car driver or a front seat passenger. The hazard situation is two-fold. Firstly, a non-secured seat lock means implies that in a situation of collision, the back supporting portion—if tiltable relative to the body part or the sitting portion of the seat—will push heavily on the back seat passenger with a force being a high multiple of the weight of the back supporting portion. Secondly, if the car has luggage in the boot or luggage space, the luggage will move forward with a force being a high multiple of its weight. Thus, as the back supporting portion does not offer any substantial resistance against the high force exerted by the forward moving luggage, this means that the rear seat passengers will receive from behind an extremely high dynamic force load, which combined with the forces exerted over the passenger front portion due to the car seat belts, could cause vital passenger injury or even cause passenger death. In case the car or vehicle has no rear seat passengers to effectively counteract such forwardly directed forces from back supporting portion or from rapidly forward moving, unsecured luggage, then the situation may be quite hazardous to a front seat passenger or a car driver. Provided the car has luggage, the luggage will effectively "fly forward" and in the best of situations hit the rear of the back supporting portion of one or both front seats. However, in view of the rear back supporting portion(s) tilting forward, such portion may not necessarily assume a horizontal position, but rather form a ramp for the rapidly forward moving luggage, thus involving the added risk of hitting an upper past of the front seat back supporting portion or even the head or neck region of the driver and/or passenger, involving the obvious risk of causing vital or fatal injury to the person involved.

Further, it should be appreciated that with a back supporting portion strecthing over the full internal width of the car, it is not sufficiently only to have the lock means on one side of the car securely locked, when the lock means on the other side of the car is not properly locked.

Thus with the ever growing use of forwardly tiltable or movable back supporting portions of rear seats in estate, saloon or hatchback cars, there is an obvious need for some means to prevent the hazard caused by the first and second lock means not being fully secured.

SUMMARY OF THE INVENTION

According to the present invention, the vehicle seat lock arrangement is improved by a switch means operatively connected with at least one of the lock means, the switch means having a first switch state in which the first and second lock means securely and mutually interconnect, and a second switch state in which the first and second lock means are at least not securely interconnected, the switch means forming part of an electric circuit having means for signalling at least the second switch state.

According to further embodiments of the inventive arrangement, said seat means is a rear seat of the vehicle where the back supporting portion is tiltable relative to the sitting portion, and where the lock means is located at an upper section of the back supporting portion.

Preferably, the switch means is a microswitch or an an optoelectric switch. The invention is particularly suited for use in a vehicle of the saloon or hatchback type with the back supporting portion through movement in a forward direction of the vehicle providing access to a rear luggage boot of the vehicle, or in an estate car type with the back supporting portion through movement in a forward direction of the vehicle providing access to a rear luggage space of the vehicle.

Said means for signalling suitably includes an optical signal device, e.g. a light emitting diode, provided in front of the car driver. The means for signalling may also include an audible signal device. Also, the signalling means could include a time switch to avoid the signalling to be operative for more than a set starting period of the car or to avoid non-interruptable signalling in case the back supporting portion of the rear seat is in a downward position in order for the car to be able to carry properly secured, long articles such as bicycles, skis, tools etc.

BRIEF DESCRIPTION OF THE DRAWINGS

The invention is now to be further described with reference to the enclosed drawing figures showing non-limitative, preferred embodiments of the arrangement according to the invention.

FIG. 1 shows in a schematic form a seat with a forwardly tiltable back supporting portion, and with lock means and switch means according to the invention.

FIG. 2 is a front portion of the arrangement in FIG. 1.

FIG. 3 is perspective view of a twin lock arrangement for a forwardly tiltable back supporting portion of a seat.

FIG. 4 is a simplified electric circuit including the lock means related switch means of the invention.

DETAILED DESCRIPTION OF THE INVENTION

Figure 5:
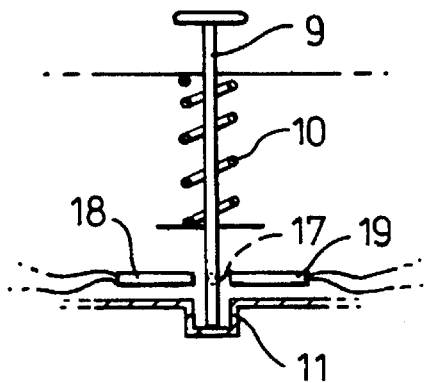
FIG. 5 is detailed example of an optoelectric switch means according to the invention.

The drawing figures show a seat means 1 having a sitting portion 2, a back supporting portion 3, said sitting portion being attached, either firmly or tiltably to a base 4 which is secured to a floor section 5 of the vehicle body. The back supporting portion 3 is in the shown, non-limitative embodiment attached to a pivot point 6 on a bracket 7 interconnecting the back supporting portion 3 with the base 4 via e.g. fastening bolts 8.

At a top part or upper side part of the back supporting portion 3 there is provided first lock means 9, e.g. formed like a peg with a handle or knob at the top and being spring loaded by means of a spring 10. Further, a second lock means 11 is attached to a body portion 12 of the vehicle, e.g. a vertical or horizontal bar or an inner side of the vehicle body. Thus, the way the lock means 9, 10 and 11 have been shown on FIGS. 1 and 2 is by way of example only in order to more fully appreciate the invention. The invention is equally applicable with other, commonly known types of lock means.

A switch 13, e.g. a microswitch as shown in FIGS. 1 and 2, is actuable by means of the peg 9 engaging the second lock means 11, e.g. a bracket having a hole, and extending slightly below the bracket to activate a microswitch arm. If the peg does not fully entend below the bracket, then the switch 13 will not be activated. The switch 13 is included in an electric circuit as shown in FIG. 4. If the seat 1' is a full width seat with a single full width back supporting portion 3' as shown in FIG. 3, then there will be required at least a further peg 9' spring tensioned by spring 10' and to engage a second lock means 11', in which case a further switch means 13' is required, operatively in series with switch means 13. If there is only a single seat to be monitored, then a single switch 13 might be sufficient, in which case the rightmost switch 13' in FIG. 4 may be deleted and the dotted ground connection will apply. A signalling means 14, e.g. a lamp or a LED is connected in series with the switch means 13 (and possibly 13'). Further, there is provided a time-out device 15 to cause the signalling means when active to signal only for a specified time. A vehicle battery 16 is included in the series circuit.

In FIG. 5 the peg 9 has a tiny hole 17 for letting light from a light emitter 18 pass through to a light receiver 19 whenever the peg has fully engaged the second lock means 11. Thus, the light receiver 19 effectively operates like switch 13. However, an important aspect is that when the lock means 11 is not present below the peg 9, e.g. when the back supporting portion 3 is tilted forwardly, the hole 17 will not be adjacent the emitter 18 and receiver 19, thus causing receiver 19 to initiate a state of "rear seat lock not engaged".

Figure 6:
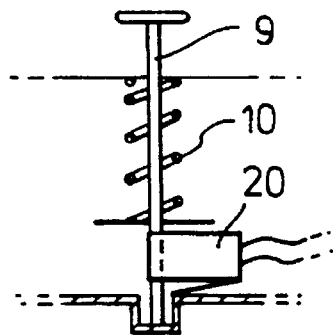
FIG. 6 is a detailed example of a modified switch means.

In FIG. 6, the peg 9 has a microswitch 20 mounted thereon, designed to operate when peg 9 fully engages lock means 11 by having a microswitch arm contact the lock means 11. In case the lock means 11 is not below the peg 9, microswitch 20 will operate, thus indicating a "rear seat lock not engaged" siituation.

Figure 7:
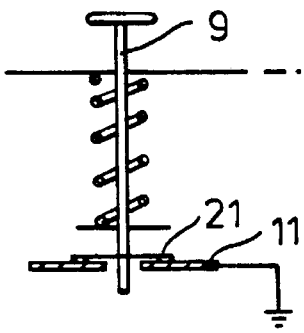
FIG. 7 is a further detailed example of a modified switch means.

In FIG. 7, the peg 9 has a first switch contact 21 mounted thereon which upon contact with lock means 11 makes effectively a closed switch, the lock means being connected to the vehicle body and therefore effectively to vehicle ground to and a pole on the vehicle battery.

As will be readily appreciated, the switch embodiments as exemplified in the drawing figures are to be construed as non-limitative to the invention, and any average expert in the art will readily appreciate that the basic principle of the invention will apply to any type of vehicle seat lock well known in the art.

Having described my invention, I claim:

1. A seat lock arrangement for a vehicle, comprising:

a seat means with a sitting portion and a back supporting portion;

means for enabling a change of position of at least a portion of said seat means relative to a body part of said vehicle; and first and second interengageable lock means for releasably interconnecting said seat means with said body part of said vehicle, said first lock means being located on said seat means and said second lock means intended to be located on said body part of said vehicle, wherein a switch means is operatively connected with at least one of said lock means, said switch means having a first switch state in which said first and second lock means securely and mutually interconnect, and a second switch state in which said first and second lock means are at least not securely interconnected, said switch means forming part of an electric circuit having means for signalling at least said second switch state.

2. A seat lock arrangement according to claim 1, wherein said back supporting portion is tiltable relative to said sitting portion, and wherein said first lock means is located at an upper section of said back supporting portion.

3. A seat lock arrangement according to claim 1, wherein said switch means is a microswitch.

4. A seat lock arrangement according to claim 1, wherein said switch means is an optoelectric switch.

5. A seat lock arrangement according to claim 1, wherein said signalling means includes a time switch.

6. A seat lock arrangement according to claim 1, wherein said means for signalling includes an optical signal device.

7. A seat lock arrangement according to claim 6, wherein the optical signal device is a light emitting diode.

8. A seat lock arrangement according to claim 6, wherein said means for signalling also includes an audible signal device.

9. A seat lock arrangement according to claim 1, wherein said seat means is a rear seat of said vehicle.

10. A seat lock arrangement according to claim 9, wherein said back supporting portion is tiltable relative to said sitting portion, and wherein said first lock means is located at an upper section of said back supporting portion.

11. A seat lock arrangement according to claim 9, wherein said vehicle is a sedan car type with said back supporting portion through movement in a forward direction of the vehicle providing access to a rear luggage boot of the vehicle.

12. A seat lock arrangement according to claim 9, wherein said vehicle is an estate car type with said back supporting portion through movement in a forward direction of the vehicle providing access to a rear luggage space of the vehicle.

* * * * *